United States Patent
Lum et al.

(10) Patent No.: US 10,590,950 B2
(45) Date of Patent: Mar. 17, 2020

(54) PUMP LINER

(71) Applicant: WEIR MINERALS AUSTRALIA LTD., Artarmon, New South Wales (AU)

(72) Inventors: Michael Lum, Frenchs Forest (AU); Colin Dooley, Winston Hills (AU)

(73) Assignee: WEIR MINERALS AUSTRALIA LTD. (AU)

( * ) Notice: Subject to any disclaimer, the term of this patent is extended or adjusted under 35 U.S.C. 154(b) by 278 days.

(21) Appl. No.: 15/500,872

(22) PCT Filed: Jul. 31, 2015

(86) PCT No.: PCT/AU2015/050432
§ 371 (c)(1),
(2) Date: Jan. 31, 2017

(87) PCT Pub. No.: WO2016/015106
PCT Pub. Date: Feb. 4, 2016

(65) Prior Publication Data
US 2017/0328375 A1    Nov. 16, 2017

(30) Foreign Application Priority Data
Jul. 31, 2014    (AU) .............................. 2014902958

(51) Int. Cl.
*F04D 29/42*        (2006.01)
*F04D 29/02*        (2006.01)
(Continued)

(52) U.S. Cl.
CPC ........ *F04D 29/4286* (2013.01); *B29C 43/003* (2013.01); *B29C 43/203* (2013.01);
(Continued)

(58) Field of Classification Search
CPC ............... F04D 29/4286; F04D 29/026; F04D 29/4293; F04D 7/04; B29C 43/003;
(Continued)

(56) References Cited

U.S. PATENT DOCUMENTS

| 1,952,179 A | 3/1934 | Milkowski et al. |
| 2,144,417 A | 1/1939 | Schneible |

(Continued)

FOREIGN PATENT DOCUMENTS

| CN | 2906149 Y | 5/2007 |
| CN | 101096765 A | 1/2008 |

(Continued)

OTHER PUBLICATIONS

International Search Report for Co-Pending PCT Application No. PCT/AU2015/050432 dated Oct. 6, 2015.

(Continued)

*Primary Examiner* — Mahmoud Gimie
(74) *Attorney, Agent, or Firm* — Foley & Lardner LLP (57) ABSTRACT

A pump liner for a centrifugal pump wherein the pump liner comprises a main pumping chamber, an inlet to the main pumping chamber and a discharge outlet extending from the main pumping chamber, wherein the pump liner is formed from at least two elastomeric compounds including a first compound and a second compound, the first compound having a different hardness to the second compound and wherein the liner is composed of the second compound at locations which in use are subject to erosive, impingement and/or directional wear.

24 Claims, 7 Drawing Sheets

(51) Int. Cl.
*B29C 43/20* (2006.01)
*B29C 43/00* (2006.01)
*F04D 7/04* (2006.01)
*B29K 21/00* (2006.01)
*B29L 31/00* (2006.01)

(52) U.S. Cl.
CPC .............. *F04D 7/04* (2013.01); *F04D 29/026* (2013.01); *F04D 29/428* (2013.01); *F04D 29/4293* (2013.01); *B29K 2021/003* (2013.01); *B29K 2995/007* (2013.01); *B29L 2031/7496* (2013.01); *F05D 2300/43* (2013.01); *F05D 2300/506* (2013.01)

(58) Field of Classification Search
CPC ............ B29C 43/203; B29K 2021/003; B29K 2995/007; B29L 2031/7496; F05D 2300/43; F05D 2300/506
USPC .......................................................... 415/197
See application file for complete search history.

(56) References Cited

U.S. PATENT DOCUMENTS

| | | | | |
|---|---|---|---|---|
| 3,876,327 | A * | 4/1975 | Lobanoff | F04D 29/026 |
| | | | | 156/172 |
| 4,113,407 | A * | 9/1978 | Grzina | F04D 7/04 |
| | | | | 415/197 |
| 4,974,998 | A * | 12/1990 | Heineman | F04D 29/4286 |
| | | | | 406/193 |
| 5,219,461 | A * | 6/1993 | Hyll | F04D 29/4286 |
| | | | | 264/255 |
| 6,582,191 | B2 | 6/2003 | Addie et al. | |
| 2009/0095436 | A1 * | 4/2009 | Pessin | B22D 19/16 |
| | | | | 164/95 |
| 2011/0142610 | A1 | 6/2011 | Burgess et al. | |
| 2014/0348645 | A1 * | 11/2014 | Koning | F04D 7/04 |
| | | | | 415/204 |

FOREIGN PATENT DOCUMENTS

| | | |
|---|---|---|
| CN | 102057165 A | 5/2011 |
| CN | 202833188 U | 3/2013 |
| DE | 3323167 A1 | 1/1985 |
| GB | 106285 A | 5/1917 |
| WO | WO-2005/033517 A3 | 4/2005 |
| WO | WO-2005033517 A2 | 4/2005 |

OTHER PUBLICATIONS

Written Opinion for Co-Pending PCT Application No. PCT/AU2015/050432 dated Oct. 6, 2015.
International Preliminary Report on Patentability for Co-Pending PCT Application No. PCT/AU2015/050432 dated Nov. 24, 2016.
Response to Written Opinion for Co-Pending PCT Application No. PCT/AU2015/050432 dated Jul. 1, 2016.
Written Opinion of the International Preliminary Examining Authority for Co-Pending PCT Application No. PCT/AU2015/050432 dated Jul. 29, 2016.
European Search Report dated Feb. 26, 2018 in corresponding European Patent Application No. 15827741.8, 9 pages.
Mural et al., Design and Equipment of Grinding Circuits, Metallurgical Industry Press, Sep. 1990, 8 pgs.
Xin Deng Zi, Practical Anti-Corrosion Engineering Construction Manual, Chemical Industrial Press, 1999, 6 pgs.

* cited by examiner

PUMP LINER

PRIORITY CLAIM

This application is a 371 filing of PCT/AU2015/050432 filed Jul. 31, 2015, which claims priority from Australian application 2014902958 filed Jul. 31, 2014, the disclosures of which are incorporated by reference in their entirety.

TECHNICAL FIELD

This disclosure relates generally to pumps and more particularly though not exclusively to centrifugal pumps for handling slurries.

BACKGROUND ART

Centrifugal slurry pumps typically comprise a pump liner (also known as a volute), which is surrounded by an exterior casing structure. The pump liner includes a pumping chamber therein in which is disposed an impeller mounted for rotation on an impeller shaft. The impeller shaft enters the pumping chamber from the rear side, or drive side, of the exterior casing structure. A discharge outlet extends tangentially from the periphery of the casing structure and provides for the discharge of fluid from the pump chamber.

The pump liner can be typically moulded from a wear resisting elastomer compound. In this form, the outer casing fitted with a respective pump liner are traditionally manufactured in two parts, or halves, held together with bolts at the periphery of the casing. The two parts join along a plane which is generally perpendicular to the axis of rotation of the pump impeller.

The elastomer compound selected for the manufacture of the pump liner is typically chosen due to its effectiveness in resisting the wear mechanisms associated with pumping slurries in centrifugal pumps. However such wear mechanisms can include abrasion, erosion, impingement and directional wear, and so a specific elastomer compound chosen may not be effective in resisting each one of the various types of wear mechanisms.

SUMMARY OF THE DISCLOSURE

In a first aspect, embodiments are disclosed of a pump liner for a centrifugal pump wherein the pump liner comprises a main pumping chamber, an inlet to the main pumping chamber, a discharge outlet extending from the main pumping chamber and a transition zone, wherein the pump liner is formed from at least two elastomeric compounds including a first compound and a second compound, the first compound having a different hardness to the second compound and wherein a substantial portion of the transition zone is composed of the second compound.

In certain embodiments, the pumping chamber and the discharge outlet each include an inner peripheral surface, the transition zone comprising a transition surface between the inner peripheral surfaces of said pumping chamber and said discharge outlet.

In certain embodiments, the transition zone includes a cutwater.

In certain embodiments, a substantial portion of the cutwater is composed of the second compound. In certain embodiments, the cutwater is composed entirely of the second compound.

In certain embodiments, the transition zone is composed entirely of the second compound.

In certain embodiments, the pump liner further comprises an exit region which includes the transition zone and at least part of the discharge outlet wherein the exit region is substantially formed from the second compound.

In certain embodiments, the exit region is composed entirely of the second compound.

In certain embodiments, the pump liner further comprises a main region wherein the main region is substantially formed from the first compound.

In certain embodiments, the main region is composed entirely of the first compound.

In certain embodiments, the pump liner comprises two side parts which can be fitted together in use wherein each of said side parts comprises a part of the main pumping chamber, the discharge outlet and the transition zone.

In a second aspect, embodiments are disclosed of a pump liner for a centrifugal pump wherein the pump liner comprises a main pumping chamber, an inlet to the main pumping chamber and a discharge outlet extending from the main pumping chamber, wherein the pump liner is formed from at least two elastomeric compounds including a first compound and a second compound, the first compound having a different hardness to the second compound and wherein the liner is composed of the second compound at locations which in use are subject to erosive, impingement and/or directional wear.

In certain embodiments, the pump liner is composed of the first compound at locations which are subject to abrasive wear in use.

In certain embodiments the locations subject to erosive, impingement and/or directional wear in use are selected from the transition zone and/or the cutwater.

In certain embodiments the locations subject to abrasive wear in use are selected from the main pumping chamber and/or the main discharge outlet In certain embodiments, the first compound has a greater hardness than the second compound.

In certain embodiments, the first compound has a Shore A° hardness of greater than or equal to about 60.

In certain embodiments, the first compound has a Shore A° hardness of less than or equal to about 90.

In certain embodiments, the second compound has a Shore A° hardness of less than or equal to about 60.

In certain embodiments, the second compound has a Shore A° hardness of greater than or equal to about 30.

In certain embodiments, the pump liner is formed from at least one further compound.

In a third aspect, embodiments are disclosed of a method of producing a side part of a pump liner for a centrifugal pump wherein the pump liner comprises a main pumping chamber, an inlet to the main pumping chamber and a discharge outlet extending from the main pumping chamber, the pump liner comprising two side parts which can be fitted together in use wherein each of said side parts comprises a part of the main pumping chamber and the discharge outlet, wherein the pump liner is formed from at least two elastomeric compounds including a first compound and a second compound, the first compound having a different hardness to the second compound, the method including the following steps:

(a) providing a mould that corresponds to one of the said side parts;

(b) positioning the first compound and the second compound in the mould;

(c) compressing the first compound and second compound at an elevated temperature into the mould to produce a moulded side part for a pump liner; and, (d) allowing the moulded side part to cure.

In certain embodiments, the first compound and the second compound are selected whereby the first and second compound cure at a substantially similar rate.

In certain embodiments, the first and second compound are selected whereby the first and second compound cure at a substantially similar temperature.

In certain embodiments, the first and second compound are selected from elastomeric compounds with a cure system selected from the following: CV (conventional), or SEV (semi-efficient), or EV (efficient) cure systems.

In certain embodiments, the first and second compound are selected from elastomeric compounds with cure system that is the same or similar.

In certain embodiments, the first and second compounds are selected from natural elastomeric compounds.

In certain embodiments, the centrifugal pump is a slurry pump for pumping fine slurries.

Other aspects, features, and advantages will become apparent from the following detailed description when taken in conjunction with the accompanying drawings, which are a part of this disclosure and which illustrate, by way of example, principles of inventions disclosed.

DESCRIPTION OF THE FIGURES

The accompanying drawings facilitate an understanding of the various embodiments.

DETAILED DESCRIPTION

As used herein, the term 'elastomer' or 'elastomeric compound' includes any material composed of long chain-like molecules, or polymers, that are capable of recovering their original shape after being stretched to great extents and includes materials derived from natural sources, such as rubber, and materials derived from synthetic sources.

As used herein, the term "hardness" of a compound refers to the "indentation hardness" of the compound which measures the resistance of a sample of the compound to material deformation due to a constant compression load from a sharp object. Hardness may be expressed as a measurement referencing the Shore A° Durometer scale.

Referring to FIGS. 1 to 5, there is illustrated a pump liner 10 having a main pumping chamber 14 therein. In the embodiment shown, the pump liner 10, in use, is disposed within an exterior casing structure of a pump (not shown), and within which an impeller can be caused to rotate (not shown).

Figure 1:
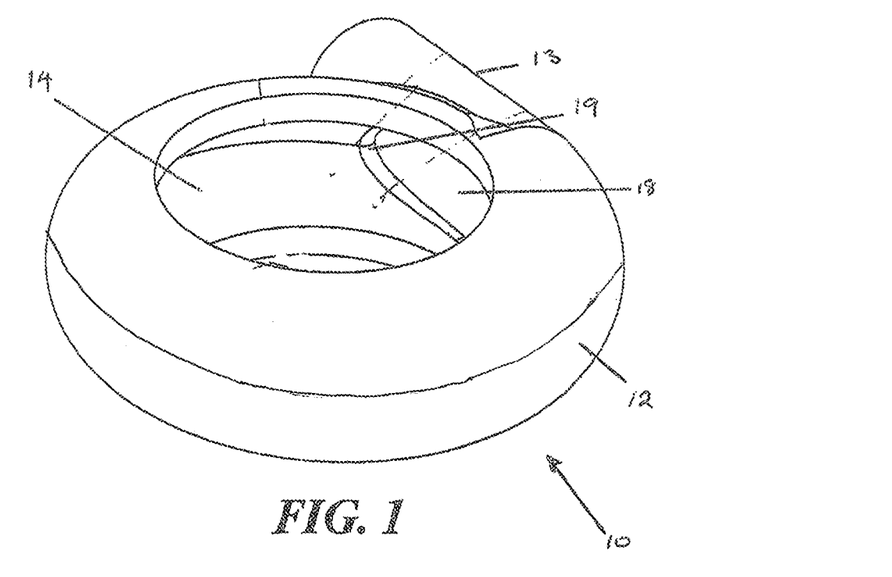
FIG. 1 is a perspective illustrations of a pump liner.
Figure 2:
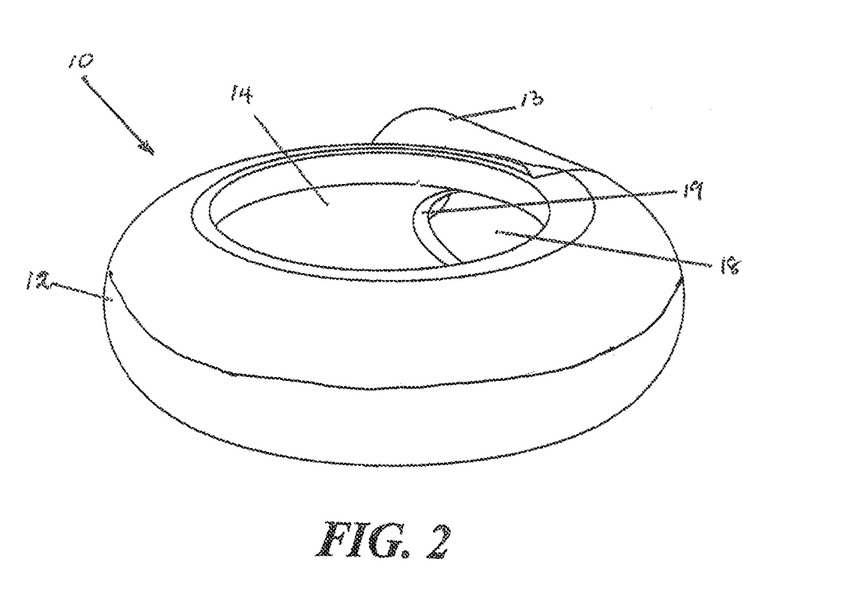
FIG. 2 is a perspective illustration of a pump liner.
Figure 3:
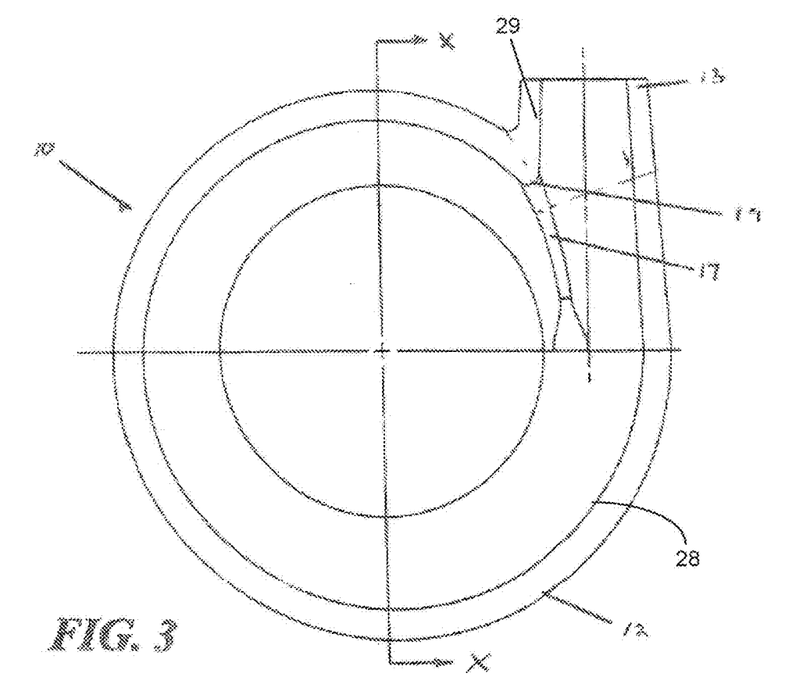
FIG. 3 is a sectional side elevation of the pump liner shown in FIGS. 1 and 2.
Figure 4:
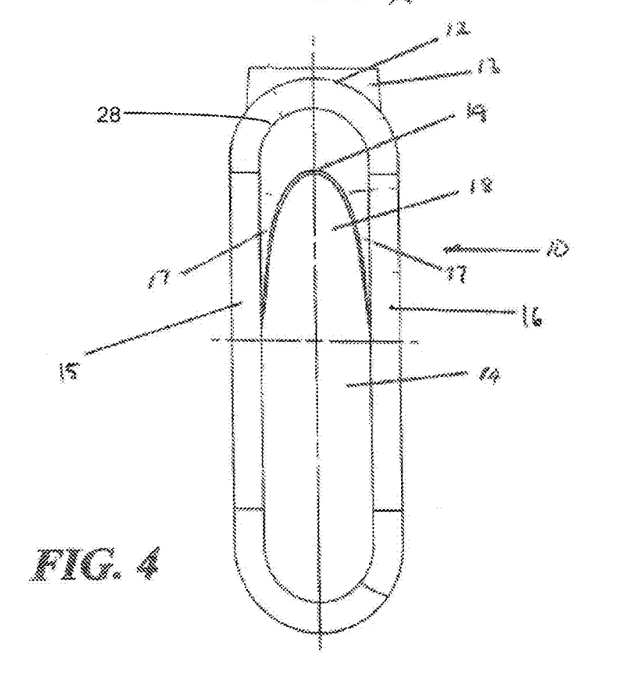
FIG. 4 is a sectional view taken along the line X-X in FIG. 3.

The pump liner 10 has openings in opposed sides 15, 16 thereof, one of which will provide for an inlet opening for the introduction of a flow of material into the main pumping chamber 14. The other opening provides for the introduction of a drive shaft used for rotatably driving the said impeller (not shown) which is disposed within the pumping chamber 14 in use. The pump liner 10 further includes a peripheral wall portion 12 having an inner peripheral surface 28 and a discharge outlet 13 which extends tangentially from the wall portion 12, the discharge outlet 13 having an inner peripheral surface 29. The main pumping chamber 14 is generally of volute shape and, in the embodiments illustrated, can be generally semi-circular in cross-section as shown in FIG. 4.

The pump liner 10 further includes a transition surface or zone 17 which extends between the inner peripheral surface 28 of the main pumping chamber 14 and the inner peripheral surface 29 of the discharge outlet 13. The transition surface or zone 17 provides for a transition between the pathway flowing through the spiral or circumferential length of the pumping chamber 14 and the discharge of fluid through the discharge outlet 13. The transition surface or zone 17 includes a cutwater 19 and two blended or transition regions or merging regions arranged to extend between the cutwater 19 and the respective inner peripheral surfaces 28, 29 of the peripheral wall portion 12 and the discharge outlet 13.

The transition surface or zone 17 is adapted in use to separate the flow of material moving through the discharge outlet 13 from the recirculating flow of material within the main pumping chamber 14. The cutwater 19 is arranged to distribute the flow into the discharge outlet 13 and reduce the recirculation flow of material in the main pumping chamber 14.

It is understood that wear mechanisms that impact on the pump liner during the operation of a slurry pump include: abrasion, erosion, impingement and directional wear. It has been found that elastomeric compounds with increased hardness are believed to provide good resistance to abrasive wear, whereas, elastomeric compounds with reduced hardness (in other words softer elastomeric compounds) provide good resistance to erosional, impingement and directional wear due to their elastic ability to absorb impacting particle energy.

Figure 5:
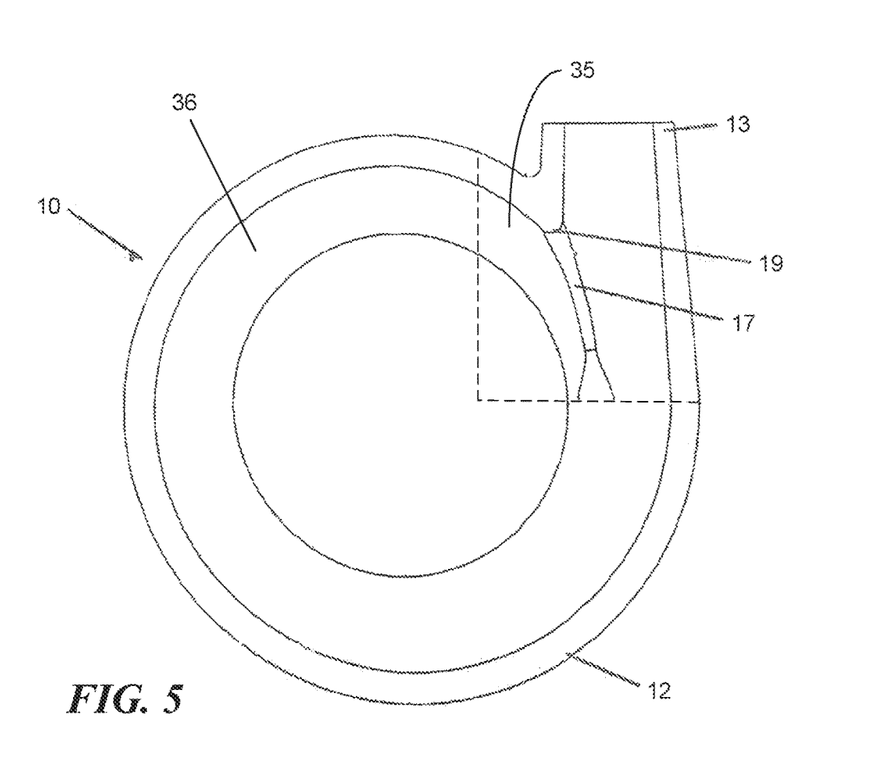
FIG. 5 is a sectional side elevation of the pump liner shown in FIGS. 1 and 2.

In one embodiment a pump liner is formed from at least two elastomeric compounds which each have a different hardness. Referring specifically to FIG. 5, which depicts a sectional side elevation of a pump liner, there is shown a main region 36 of the pump liner 10 and an exit region 35 distinguished from the main region 36 by a dotted line. The main region 36 includes a majority of the pump liner 10 and makes up a substantial portion of the pumping chamber 14, whereas the exit region 35 includes the transition zone 17 and cutwater 19 as well as the discharge outlet. In this embodiment a first elastomeric compound forms the main region 36 of the pump liner, and a second elastomeric compound forms the exit region 35.

In one embodiment, the first elastomeric compound has a hardness which is greater than the hardness of the second elastomeric compound. In preferred embodiments, the first elastomeric compound has a Shore A° hardness of greater than or equal to 60 and less than or equal to 90, and in more preferred embodiments the first elastomeric compound has a Shore A° hardness of greater than or equal to 60 and less than or equal to 70. In a further preferred embodiment the second elastomeric compound has a Shore A° hardness of greater than or equal to 30 and less than or equal to 60, and in more preferred embodiments the second elastomeric compound has a Shore A° hardness of greater than or equal to 45, and less than or equal to 55. In a typical example, the first elastomeric compound has a Shore A° hardness of 65, and the second elastomeric compound has a Shore A° hardness of 50.

Counterintuitively, it was found that if an elastomer with a reduced hardness (i.e. the second elastomeric compound) was used to form a substantial portion of the transition zone 17 and an elastomer with increased hardness (i.e. the first elastomeric compound) was used to form a substantial portion of the remainder of the pump liner, an overall reduction in wear was obtained when the pump liner is in use.

Without wishing to be bound by theory, it is thought that an elastomeric compound with reduced hardness exhibits better erosive, impingement and directional slurry wear resistance because the elastomer also has higher resilience properties than an elastomeric compound with a greater hardness. Because the pumping chamber 14 of the pump liner 10 is subjected to wear mechanisms which are predominantly abrasive, it was found that forming the majority of the pump liner 10, or main region 36, out of a first elastomer compound with greater hardness and forming the exit region 35, or at least a substantial portion of the transition zone 17 out of a second elastomeric compound with reduced hardness resulted in a pump liner 10 which showed better wear characteristics than pump liners formed from only one elastomeric compound.

In certain embodiments, at least a substantial portion of the transition zone 17 may be composed of the elastomer of reduced hardness (i.e. the second elastomeric compound), or in another embodiment at least a substantial portion of the cutwater may be composed of the elastomer of reduced hardness. The term "substantial portion" when used to describe the composition of the transition zone 17 indicates that at least 50% of the transition zone 17, is composed of the elastomer of reduced hardness. Similarly, the term "substantial portion" when used to describe the composition of the cutwater 19 indicates that at least 50% of the cutwater 19, is composed of the elastomer of reduced hardness. In preferred embodiments, at least 80% of the cutwater 19 is composed of the elastomer of reduced hardness and in more preferred embodiments 100% of the cutwater 19 is composed of the elastomer of reduced hardness.

In certain preferred embodiments, at least 80% of the transition zone including the cutwater is composed of the elastomer of reduced hardness (i.e. the second elastomeric compound). In more preferred embodiments, 100% of the transition zone including the cutwater is composed of the elastomer of reduced hardness.

In certain embodiments, it was found that wear mechanisms at the transition zone 17 and in particular the cutwater 19 of the pump liner when pumping fine slurries were found to be predominantly erosive, impingement and directional wear mechanisms.

In certain embodiments it was found that wear mechanisms at the transition zone 17, and in particular the cutwater 19, of the pump liner were found to be predominantly erosive, impingement and directional wear mechanisms when pumping slurries which comprise a fluid with suspended particles with a particle size of less than or equal to about a P80 of 250 µm (250×10$^{-6}$ m), and in particular suspended particles with a particle size of less than or equal to about a P80 of 100 µm (100×10$^{-6}$ m).

As described herein, the term "fine slurries" describes a slurry with suspended particles of less than or equal to about a P80 of 100 µm (100×10$^{-6}$ m).

In certain embodiments, a substantial portion of the regions of a pump liner that are subject to erosive, impingement and directional slurry wear are composed of the elastomer of reduced hardness (i.e. the second elastomeric compound). In preferred embodiments, all of the regions of a pump liner that are subject to erosive, impingement and directional slurry wear are composed of the elastomer of reduced hardness.

In certain embodiments, at least a portion of the discharge outlet is composed of the elastomer of reduced hardness (i.e. the second elastomeric compound). In a preferred embodiment, the portion of the discharge outlet composed of the elastomer of reduced hardness is adjacent the transition zone including the cutwater. In an alternative embodiment, the entire discharge outlet is composed of the elastomer of reduced hardness.

In accordance with another embodiment, a method of producing a pump liner as herein described involves the use of at least two elastomeric compounds. A first elastomeric compound with a hard Shore A° Durometer score that is suited for slurry abrasion and a second elastomeric compound with a lower Shore A° Durometer score that exhibits good erosive, impingement and directional slurry wear resistance.

Figure 6:
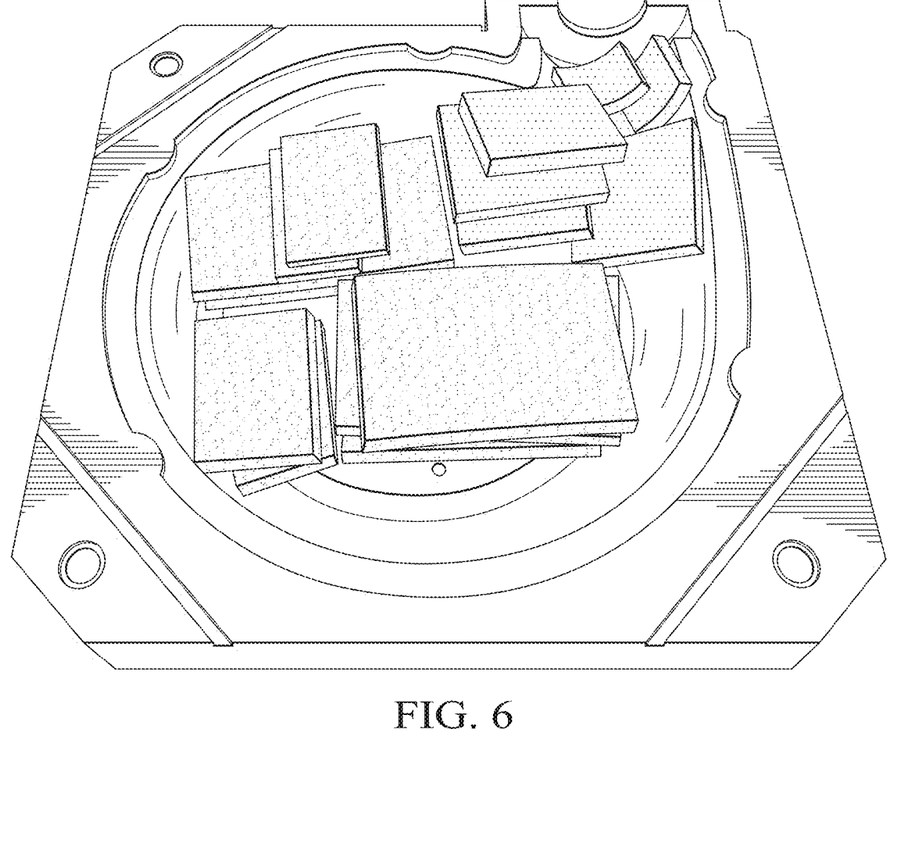
FIG. 6 is a photograph of a mould for the production of a pump liner depicting the first and second elastomer compounds loaded into the mould before the moulding process.
Figure 7:
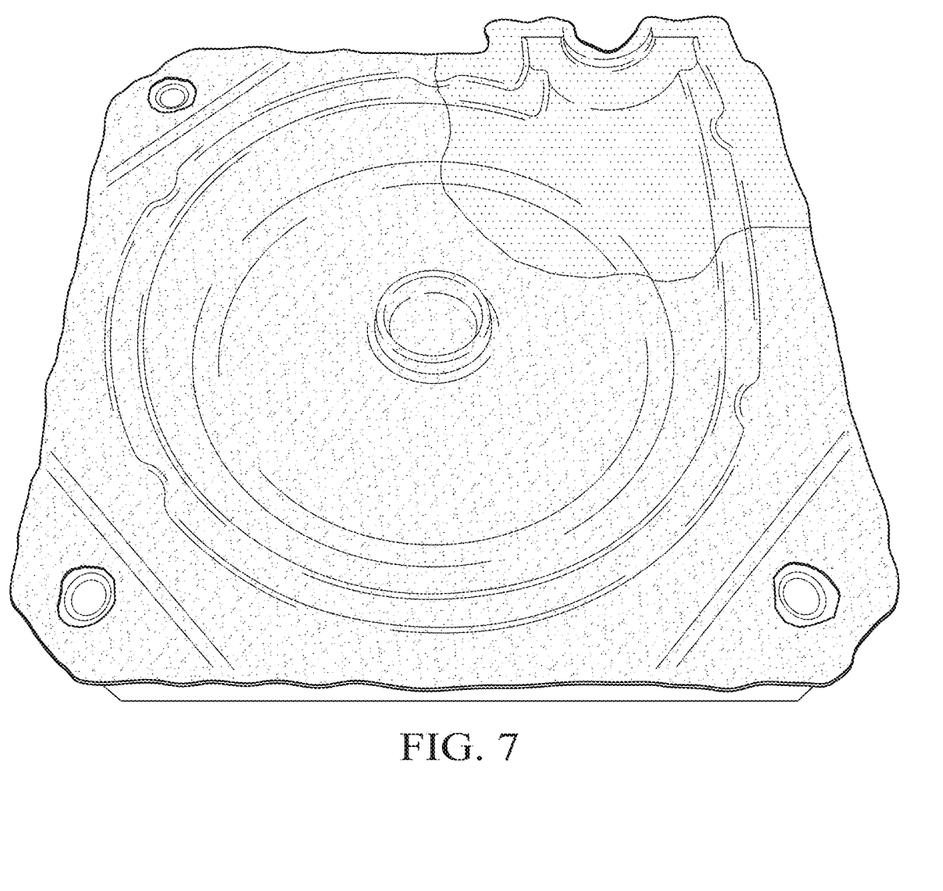
FIG. 7 is a photograph of the same mould in FIG. 6 after the moulding process.

Referring to FIGS. 6 and 7, there is shown a mould for one half of a pump liner wherein the second elastomeric compound (shown in pink (or light grey) for demonstration purposes) is moulded into the exit region of the pump liner including the cutwater, transition zone and the discharge outlet. The first elastomeric compound (shown as the darker of the two elastomeric compounds) is moulded into the main region of the pump liner. By using a compression force onto the mould at a temperature of up to and including 160° C., one side part of a pump liner is produced (as best seen in FIG. 7) which is composed of the two elastomeric compounds, with the first elastomeric compound forming the main region of the pump liner (shown as the darker section of the liner) and the second elastomeric compound forming the exit region including the transition zone, cutwater and discharge outlet (shown as the lighter shaded section of the liner).

Figure 8:
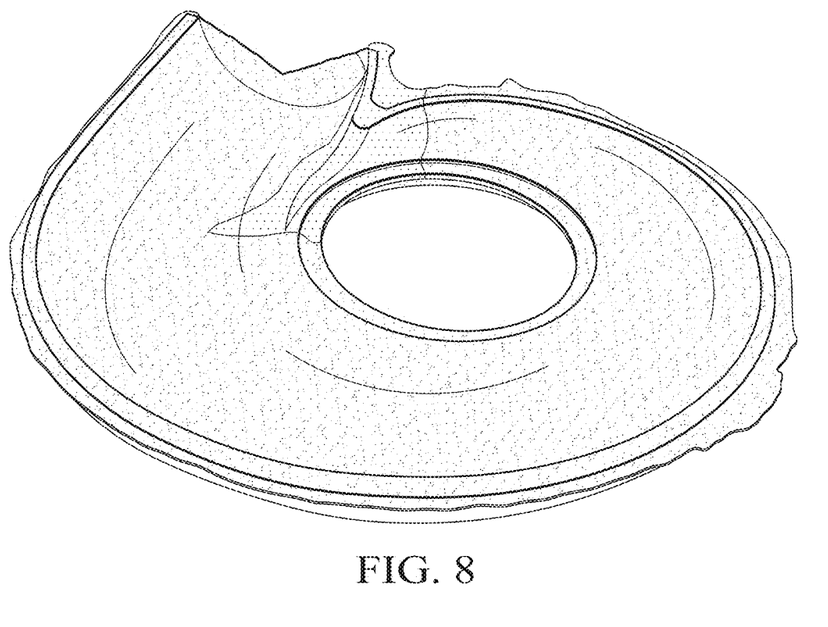
FIG. 8 is a photograph of one side part of a pump liner that has been removed from a mould depicting the first elastomer compound in the darker shade and the second elastomer compound in the lighter (or red) shade.

A further embodiment of a side part of a pump liner, produced by the method as herein described, is shown in FIG. 8 which is a photograph of a side part of a pump liner composed of two elastomeric compounds, with the first elastomeric compound forming the main region of the pump liner (again shown as the darker shaded section of the liner) and the second elastomeric compound forming the transition zone and cutwater and a minor portion of the discharge outlet adjacent the transition zone (shown as the lighter shaded region).

In certain embodiments, the at least two elastomeric compounds are selected from a first compound and a second compound wherein the second compound has a reduced hardness compared to the first compound. In preferred embodiments, the at least two elastomeric compounds are selected from elastomeric compounds with cure systems including: CV (conventional), or SEV (semi-efficient), or EV (efficient) cure systems. In more preferred embodiments, the at least two elastomeric compounds cure at similar rates, and in further preferred embodiments, the at least two elastomeric compounds are selected from elastomeric compounds having the same or similar cure systems.

In certain embodiments, at least two elastomeric compounds are selected from a first compound and a second compound wherein the at least two elastomeric compounds include similar amounts of accelerators (eg metal oxides), activators, vulcanising agents (eg sulfur, metal oxides, peroxide), waxes and/or oils.

Table A below provides an example embodiment where CV (conventional), SEV (semi-efficient) or EV (efficient) cure systems are outlined:

TABLE A

Typical CV, SEV and EV cure/vulcanisation systems

| Type | Sulfur (S, phr) | Accelerator (A, phr) | A/S ratio |
|------|-----------------|----------------------|-----------|
| CV   | 2.0-3.5         | 0.4-1.2              | 0.1-0.6   |
| SEV  | 1.0-1.7         | 1.2-2.4              | 0.7-2.5   |
| EV   | 0.4-0.8         | 2.0-5.0              | 2.5-12.0  |

In certain embodiments, the at least two elastomeric compounds are selected from a first compound and a second compound wherein the first compound combines with substantial cohesion with the second compound during the moulding process. In preferred embodiments, the first compound and the second compound are both selected from natural rubber elastomeric compounds, or alternatively, the first compound and the second compound are both selected from synthetic rubber elastomeric compounds.

Experimental Simulation

Figure 9:
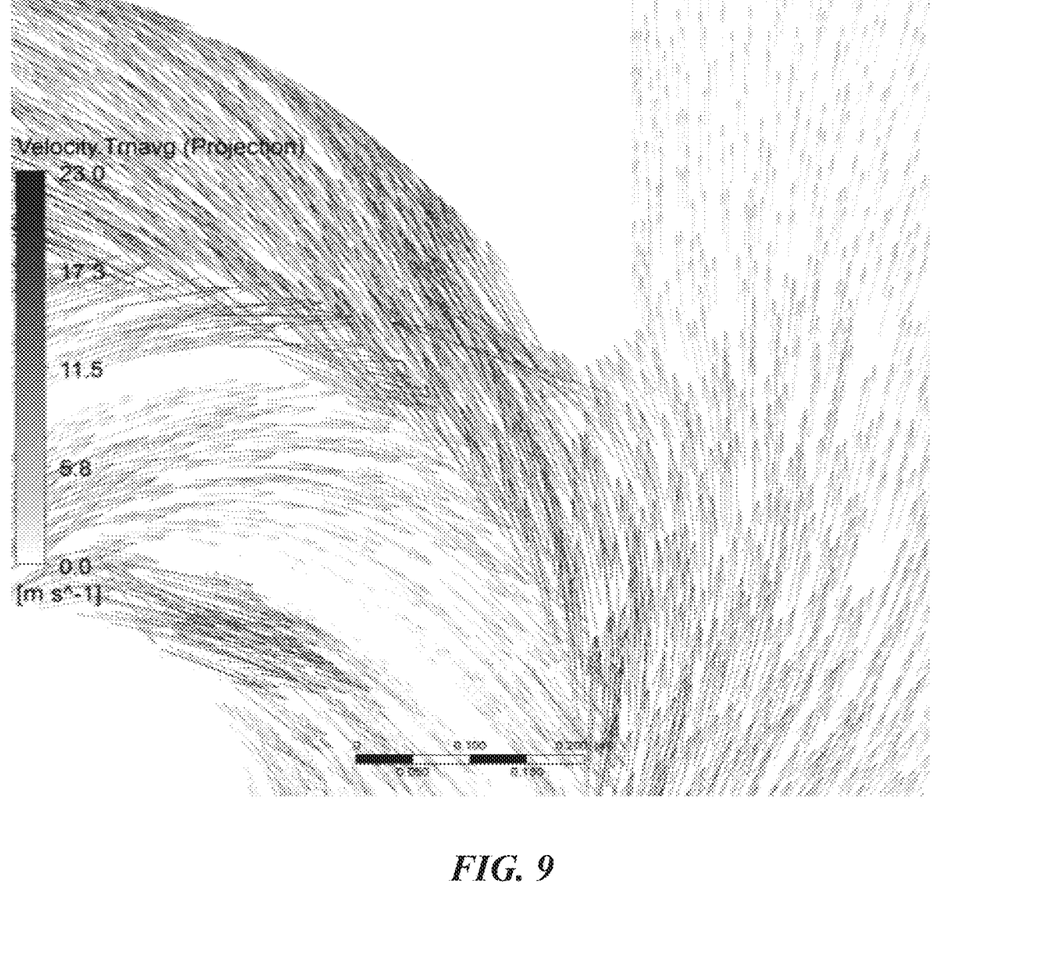
FIG. 9 is a cross-sectional view of a pump liner depicting CFD velocity vectors in the region of the transition zone.

Computational experiments were carried out to simulate flow patterns in the various designs of the pump liner, using commercial software ANSYS CFX. This software applies Computational Fluid Dynamics (CFD) methods to solve the velocity field for the fluid being pumped. The software is capable of solving many other variables of interest however velocity is the variable which is relevant for FIG. 9 shown herein.

For each CFD experiment, the results are post-processed using the corresponding module of CFX. FIG. 9 shows a cross-sectional view of a section of a pump liner showing the transition zone including the cutwater of the pump liner for a slurry pump. The simulation may be used to represent particle flow within the pump liner during the pumping process particularly when the particles in the fluid are very small and fine. As can be seen from the direction of the velocity vectors, direct impingement and high angle particle impact would be the contributing wear mechanism at the location of the cutwater. The areas surrounding the transition zone show the fluid flow indicative of low angle sliding wear. Considering this fluid flow and in the instance that the particles making up the slurry are very small and fine in size distribution, the results of the simulation support the use of an elastomeric compound with a lower Shore A° Durometer score that exhibits good erosive, impingement and directional slurry wear resistance at the cutwater and transition zone regions of the pump liner, and an elastomeric compound with a hard Shore A° Durometer score in other areas of the pump liner that are affected by slurry abrasion wear.

Experimental Results

Two natural rubber compounds were selected to produce a slurry pump liner. The two rubber compounds included Rubber A which selected from a hard Shore A° Durometer compound and Rubber B selected from a soft Shore A° Durometer and high resilient compound.

Rubber B was moulded into the transition zone including the cutwater region of the rubber slurry pump liner during production. It is believed that wear mechanisms at the transition zone and cutwater of the pump liner during the pumping operation of fine slurries are predominantly erosive, impingement and directional wear mechanisms. It is believed that by using a softer and higher resilient Rubber B in the transition zone and cutwater of the pump liner that this may result in better performance and increase wear resistance than if the harder Rubber A was used in this location.

FIG. 8 illustrates the Rubber A and B moulded into a rubber pump liner at the transition zone and cutwater. The Rubber B of lesser hardness is highlighted as the lighter coloured material making up the composition of the pump liner.

Physical Testing—Hardness, Density, & Resilience

The hardness of both the rubber compounds Rubber A and Rubber B was tested in accordance with ASTM D2240 and measured using a Shore A° Durometer. The density of the rubber samples was measured using a volume displacement method, as per ASTM D297-15. The Shore resilience of the rubber samples was tested tested in accordance to ASTM D2632 and measure using an Instron Shore A° Resiliometer. The results of these tests are outlined in Table 1.

TABLE 1

| Test | Units | Test Standard | Rubber A | Rubber B |
|------|-------|---------------|----------|----------|
| Hardness | Shore A° | ASTM D2240 | 62 | 50 |
| Density | g/cm$^3$ | ASTM D297-15 | 1.11 | 1.06 |
| Resilience Bashore | % | ASTM D2632 | 38 | 64 |

Wear Testing—Slurry Erosion Tester

A slurry Erosion tester was used to simulate high velocity particles that impinge on the surface of a material causing material removal. This is considered to be erosive wear, which is the result of continuous particles in a fluid system impacting on the surface of a material causing material removal and damage.

Wear Testing—Chip and Cut Wear Tester

The BF Goodrich chip and cut wear tester (developed by the automotive tyre industry) was used to simulate chipping and cutting of samples of Rubber A and Rubber B. This test provides an indication of the abrasion resistance of an elastomer. In the test, a tungsten carbide blade drops onto a rubber wheel of the sample at a rate of 60 times a minute as the rubber wheel spins at a rate of 760 cycles per minute. The wear is caused by the tungsten carbide blade chipping and/or cutting the surface of the rubber wheel. The chip and cut wear tester has shown that Rubber A material was the most resistant to abrasive wear whereas Rubber B displayed significantly less resistance to abrasive wear.

The wear test results shown in Table 2 demonstrate the effective wear resistance of a rubber pump lining material when exposed to different wear mechanisms. The slurry erosion test was used to replicate direct and high angle impingement wear for a fine slurry application. The results of this test show that the softer, higher resilient rubber, i.e. Rubber B, will result in better wear performance than a harder, low resilient rubber such as Rubber A. In reference to the side part of the pump liner shown in FIG. 9, the area of the transition zone and cutwater experiences direct and high angle impingement. Having Rubber B in this location should improve the wear resistance of the transition zone and cutwater.

The chip and cut wear test conversely demonstrated the abrasion and chip and cut resistance of a rubber pump lining material. The results in Table 2 show the harder, low resilient Rubber A has better wear resistance compared to the softer Rubber B. These test results demonstrate the requirement for different rubber compounds in different locations in slurry pump rubber liners in order to improve the overall wear resistance of the pump liner.

TABLE 2

| Test | Units | Rubber A | Rubber B |
|------|-------|----------|----------|
| Erosion | mm³ | 17.5 | 6.7 |
| Chip & Cut | mm³ | 0.1 | 1.2 |

In the foregoing description of preferred embodiments, specific terminology has been resorted to for the sake of clarity. However, the invention is not intended to be limited to the specific terms so selected, and it is to be understood that each specific term includes all technical equivalents which operate in a similar manner to accomplish a similar technical purpose. Terms such as "front" and "rear", "inner" and "outer", "above", "below", "upper" and "lower" and the like are used as words of convenience to provide reference points and are not to be construed as limiting terms.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

| Table of Parts | |
|---|---|
| Pump Liner | 10 |
| Peripheral Wall Portion | 12 |
| Pumping Chamber | 14 |
| Opposed Sides | 15, 16 |
| Discharge Outlet | 13 |
| Cutwater | 19 |
| Transition Zone | 17 |
| Inner Peripheral Surface (Peripheral Wall Portion) | 28 |
| Inner Peripheral Surface (Discharge Outlet) | 29 |
| Exit Region | 35 |
| Main Region | 36 |

The invention claimed is:

1. A pump liner for a centrifugal pump, wherein the pump liner comprises:
   a main pumping chamber having an inner peripheral surface portion;
   an inlet to the main pumping chamber;
   a transition zone; and
   a discharge outlet positioned adjacent to the transition zone and having an inner peripheral surface portion,
   wherein the transition zone includes a transition surface between the inner peripheral surface portion of the pumping chamber and the inner peripheral surface portion of the discharge outlet,
   wherein the pump liner is formed from at least two elastomeric compounds including a first compound and a second compound, the first compound having a greater hardness than the second compound and wherein at least 50% of the transition zone is composed of the second compound,
   wherein the pump liner has a main region and an exit region, the main region encompassing at least a substantial portion of the main pumping chamber,
   wherein the main region is formed from the first compound,
   wherein the exit region includes the transition zone and at least part of the discharge outlet, and
   wherein the exit region is substantially formed from the second compound.

2. A pump liner according to claim 1, wherein the transition zone includes a cutwater.

3. A pump liner according to claim 2, wherein the cutwater is composed entirely of the second compound.

4. A pump liner according to claim 1, wherein the transition zone is composed entirely of the second compound.

5. A pump liner according to claim 1, wherein the exit region is composed entirely of the second compound.

6. A pump liner according to claim 5, wherein the main region is composed entirely of the first compound.

7. A pump liner according to claim 1, comprising two side parts which can be fitted together in use.

8. A pump liner according to claim 7, wherein each of said side parts comprises a part of the main pumping chamber, the discharge outlet, and the transition zone.

9. A pump liner according claim 1, wherein the first and second compounds are selected from natural elastomeric compounds.

10. A pump liner according to claim 1, wherein the centrifugal pump is a slurry pump for pumping fine slurries.

11. A pump liner for a centrifugal pump, wherein the pump liner comprises:
    a main pumping chamber having an inner peripheral surface portion;
    an inlet to the main pumping chamber;
    a transition zone; and a discharge outlet having an inner peripheral surface portion and extending from the transition zone, wherein the transition zone includes a transition surface between the inner peripheral surface portion of the pumping chamber and the inner peripheral surface portion of the discharge outlet, wherein the pump liner is formed from at least two elastomeric compounds including a first compound and a second compound, wherein the first compound has a greater hardness than the second compound, wherein the second compound is provided in at least 50% of the transition zone, wherein the pump liner has a main region and an exit region, the main region encompassing at least a portion of the main pumping chamber, wherein the main region is formed from the first compound that has the greater hardness than the second compound, wherein the exit region includes the transition zone and at least part of the discharge outlet, and wherein the exit region is substantially formed from the second compound.

12. A pump liner claim 11, wherein the first compound has a Shore A° hardness of greater than or equal to about 60.

13. A pump liner according to claim 11, wherein the first compound has a Shore A° hardness of less than or equal to about 90.

14. A pump liner according to claim 11, wherein the second compound has a Shore A° hardness of less than or equal to about 60.

15. A pump liner according to claim 11, wherein the second compound has a Shore A° hardness of greater than or equal to about 30.

16. A pump liner according to claim 11, wherein the pump liner is formed from at least one further compound.

17. A pump liner according to claim 11, wherein the centrifugal pump is a slurry pump for pumping fine slurries.

18. A method of producing a side part of a pump liner for a centrifugal pump, wherein the pump liner comprises a main pumping chamber having an inner peripheral surface portion, an inlet to the main pumping chamber, a transition zone, and a discharge outlet positioned adjacent to the transition zone and having an inner peripheral surface portion the transition zone comprising a transition surface between the inner peripheral surface portion of the pumping chamber and the inner peripheral surface portion of the discharge outlet, the pump liner comprising two side parts which can be fitted together in use wherein each of said side parts comprises a part of the main pumping chamber and the discharge outlet, wherein the pump liner is formed from at least two elastomeric compounds including a first compound and a second compound, the first compound having a greater hardness than the second compound, wherein at least 50% of the transition zone is composed of the second compound, wherein the pump liner has a main region and an exit region, the main region encompassing at least a substantial portion of the main pumping chamber and formed from the first compound, wherein the exit region includes the transition zone and at least part of the discharge outlet, wherein the exit region is substantially formed from the second compound, the method including the following steps:

a) providing a mould that corresponds to one of the said side parts;

b) positioning the first compound and the second compound in the mould;

c) compressing the first compound and second compound at an elevated temperature into the mould to produce a moulded side part for a pump liner; and, d) allowing the moulded side part to cure.

19. A method according to claim 18, wherein the first compound and the second compound are selected whereby the first and second compound cure at a substantially similar rate.

20. A method according to claim 18, wherein the first and second compound are selected whereby the first and second compound cure at a substantially similar temperature.

21. A method according to claim 18, wherein the first and second compounds are selected from elastomeric compounds with a cure system selected from the following: CV (conventional), or SEV (semi-efficient), or EV (efficient) cure systems.

22. A method according to claim 21, wherein the first and second compound are selected from elastomeric compounds with cure system that is the same or similar.

23. A method according to claim 18, wherein the centrifugal pump is a slurry pump for pumping fine slurries.

24. A method according to claim 18, wherein the first and second compounds are selected from natural elastomeric compounds.

* * * * *